United States Patent

Yamada et al.

Patent Number: 5,325,460
Date of Patent: Jun. 28, 1994

[54] SYSTEM AND METHOD FOR CONTROLLING THE SPEED OF AN ELECTRIC MOTOR IN AN EXTREMELY LOW SPEED RANGE USING A ROTARY PULSE ENCODER

[75] Inventors: Tetsuo Yamada; Tatsuoki Matsumoto; Masayuki Mori, all of Tokyo, Japan

[73] Assignee: Kabushiki Kaisha Meidensha, Tokyo, Japan

[21] Appl. No.: 885,763

[22] Filed: May 20, 1992

[30] Foreign Application Priority Data

| | | | |
|---|---|---|---|
| May 20, 1991 | [JP] | Japan | 3-114229 |
| Aug. 9, 1991 | [JP] | Japan | 3-200314 |
| Nov. 21, 1991 | [JP] | Japan | 3-305791 |
| May 8, 1992 | [JP] | Japan | 4-115586 |

[51] Int. Cl.$^5$ .................................. H02P 5/17
[52] U.S. Cl. ........................... 388/811; 388/904; 388/906; 388/907.5; 388/930; 318/599; 318/602; 318/609
[58] Field of Search .......... 388/809–815, 388/907.5, 904, 906, 930; 318/599–603, 606, 609, 611, 615–618, 632, 684

[56] References Cited

U.S. PATENT DOCUMENTS

| | | | |
|---|---|---|---|
| 4,680,518 | 7/1987 | Kurakake et al. | 318/561 |
| 4,740,885 | 4/1988 | Gose et al. | 318/561 |
| 4,851,754 | 7/1989 | Sakamoto et al. | 318/616 |
| 4,862,343 | 8/1989 | Nomura et al. | 363/41 |
| 4,885,520 | 12/1989 | Sugimoto et al. | 318/808 |

FOREIGN PATENT DOCUMENTS

| | | |
|---|---|---|
| 0069469 | 1/1983 | European Pat. Off. |
| 0208788 | 1/1987 | European Pat. Off. |
| 0241563 | 10/1987 | European Pat. Off. |
| 0279415 | 8/1988 | European Pat. Off. |
| 333054 | 9/1989 | European Pat. Off. |

Primary Examiner—William M. Shoop, Jr.
Assistant Examiner—David Martin
Attorney, Agent, or Firm—Foley & Lardner

[57] ABSTRACT

A system and method for controlling the speed of a motor operating in an extremely low speed range and having a rotary pulse encoder which outputs a pulse whenever a rotation axle of the motor has rotated through a predetermined angle. The extremely low speed range is defined such that its pulse interval of the output pulses is longer than a speed control period of the system are disclosed, load torque estimated value observer is provided. The least order disturbance observer includes a first calculating block which calculates an estimated value of the motor speed $n_M'$ (j) of a motor model on the basis of a torque command and a load torque estimated value: a second calculating block which calculates an average value of the motor speed at each pulse interval $n_M'$ (j).

22 Claims, 11 Drawing Sheets

SYSTEM AND METHOD FOR CONTROLLING THE SPEED OF AN ELECTRIC MOTOR IN AN EXTREMELY LOW SPEED RANGE USING A ROTARY PULSE ENCODER

BACKGROUND OF THE INVENTION (1) Field of the Invention

The present invention relates to a system and method for controlling a speed of an electric motor in an extremely low speed range of the motor using a rotary pulse encoder as a motor speed detector.

(2) Description of the Background Art

Generally, in a previously proposed speed control system for an electric motor using a rotary pulse encoder having a relatively low resolution, each interval of adjacent pulses (or the period of each rising pulse) derived from the pulse encoder usually becomes longer than a speed control period (or sampling pulse interval derived from a reference clock of a microcomputer to derive the motor speed). When the motor rotates at an extremely low speed, accurate speed information cannot be obtained during the speed control period.

Therefore, the speed control system described above often becomes unstable in the extremely low speed rang 13 as described below with reference to FIGS. 1 (A) through 1 (D).

The pulse encoder linked across a rotation axle of the motor produces a pulse as shown in FIG. 1 (C) in the low speed range of the motor near zero.

In detail, a rotation speed $n_M$ with respect to a time t at a low speed range of the motor generally indicates a linear characteristic, as shown in FIG. 1 (A).

However, an angular position $\theta$ of the rotation axle of the motor with respect to time t generally indicates a curved characteristic as shown in FIG. 1 (B).

Hence, a pulse train derived from the pulse encoder has a pulse interval which becomes narrower as the time t has passed by as shown in FIG. 1 (C).

At a time when the pulse information of FIG. 1 (C) is changed, an average speed $n_{M(j)}$ for the pulse interval $T_{p(j)}$, is derived as shown in FIG. 1 (D) according to the pulse interval $T_{p(j)}$ and a change rate of the pulse with respect to the pulse interval $T_{p(j)}$. Therefore, if the pulse interval $T_{p(j)}$ is longer than the speed control period, the speed between each speed control period cannot be detected.

At this time, the average speed value using a previous value thereof $n_{Mj-1}$ is used. Consequently, a deviation between the values of the average speed and real speed $n_M$ comes accordingly large as the motor speed becomes unstable in the lower speed range and in the speed control.

A Japanese Patent Application First Publication Heisei 2-307384 published on Dec. 20, 1990 exemplifies another previously proposed speed control system which has improved this unstable speed control characteristic.

In the disclosed Japanese Patent Application First Publication, the speed control system determines the rotation speed in the extremely low speed range using a load torque estimated value. However, since the means using the load torque estimated value is a type of a perfect order state observer, an adjustment of its gain (PI) is extremely difficult.

On the other hand, such an unstable control problem and a slow-responsive characteristic problem in the extremely low speed range of the motor rotation needs to be solved. Particularly, these problems need to be solve for applications of servomotor mechanisms and elevators demanding a high positioning accuracy.

Although a resolver or a highly precise rotary pulse output encoder has been used as the speed detector, many difficult problems such as adjustments and/or cost, problems in addition to the unstable control problem occur.

A Japanese Paper of T. IEE Japan, Vol. 107-D, No. 12, 1987 titled "Digital Servo Using Speed Estimation Observer" exemplified another previously proposed digital servo system using speed estimation observer (using the perfect order state observer) which is an expanded version of a load torque estimation observer.

SUMMARY OF THE INVENTION

It is, therefore, an object to provide a speed control system and method in which a stable speed control for a motor in an extremely low speed range can be achieved and an easy adjustment of control gain can also be achieved.

The above-described object can be achieved by providing a system for controlling a motor speed, comprising: a) an electric motor; b) a speed detector attached around a rotation axle of the electric motor for detecting a rotation speed of the motor and producing and outputting a series of pulses according to the detected rotation speed; and c) a motor speed estimation observer using a least order disturbance observer on a load estimated value, the least order disturbance observer being converted into a discrete system model of a speed control period system and speed detecting period system and the motor speed estimation observer being used to estimate the motor speed at a pulse interval of the pulses derived from the speed detector.

The above-described object can also be achieved by providing a system for controlling a motor speed for an electric motor in an extremely low speed range having a rotary pulse encoder which outputs a pulse whenever a rotation axle of the motor has rotated through a predetermined angle, the extremely low speed range being defined such that a pulse interval of the output pulses is longer than a speed control period of the system, comprising: a least order disturbance, load torque estimated value observer, said observer including: a first calculating block which calculates an estimated value of the motor speed $n_M'(j)$ of a motor model on the basis of a torque command and a load torque estimated value; a second calculating block which calculates an average value of the motor speed at each pulse interval $n_M'(j)$ as follows:

$n_M'(j) = [\Sigma n_M'(i)]j/n(j)$, wherein i denotes the speed control period and j denotes the pulse interval of the pulse encoder, a first deviating block which deviates between the average value of the motor speed derived from the second calculating block $n_M'(j)$ and an average value of the motor speed $n_M(j)$ derived on the basis of the pulses of the pulse encoder, a second deviating block which deviates between the output value of the first deviating block $n_M'(i)$ and the deviated output $n_M(j) - n_M(j)$ of the first deviating block to derive the value of $n_M(i)$, a proportional gain observer which outputs the estimated load torque value $\tau_L(i)$ from the deviated output of the first deviating block, and a third deviating block which deviates between the load torque command $\tau_M(i)$ and the load estimated value $\tau_L(j)$ from the proportional gain observer.

The above-described objective can also be achieved by providing a method for a motor speed for an electric motor in an extremely low speed range using a rotary pulse encoder which outputs a pulse whenever a rotation axle of the motor has rotated through a predetermined angle and a least order disturbance, load torque estimated value observer, the extremely low speed range being defined such that a pulse interval of the output pulses is longer than a speed control period, comprising the steps of: a) calculating an estimated value of the motor speed $n_M'(j)$ of a motor model on the basis of a torque command and a load torque estimated value; b) calculating an average value of the motor speed at each pulse interval $n_M'(j)$ as follows:

$$n_M'(j) = [\Sigma n_M'(i)]j/n(j),$$

wherein i denotes the speed control period and j denotes the pulse interval of the pulse encoder, c) providing a first deviation output between the average value of the motor speed derived in the step b) $n_M'(j)$ and an average value of the motor speed $n_M(j)$ derived on the basis of the pulses of the pulse encoder, d) providing a second deviation output between the output value derived in the step a) $n_M'(i)$ and the deviated output of the step c) to derive the value of $n_M(i)$, e) outputting the estimated load torque value $\tau_L(j)$ from the first deviated output of the step c), and f) providing a third deviation output between the load torque command $\tau_M(i)$ and the load estimated value $\tau_L(i)$ derived in the step e).

DETAILED DESCRIPTION OF THE PREFERRED EMBODIMENTS

Reference will hereinafter be made to the drawings in order to facilitate a better understanding of the present invention.

FIGS. 1 (A) through 1 (D) have been explained in the BACKGROUND OF THE INVENTION.

FIRST PREFERRED EMBODIMENT

First, a zero-speed observer using a load torque estimation observer (least order disturbance observer) will be explained below.

It is noted that the items of (A) and (B) to be described below are based on a Japanese Paper titled "A Speed Estimation Method at Very Low Speed Region Using Least Order Disturbance Observer" published in Japan on Aug. 27, 1991 at Heisei 3 National Seminar of Electric Society, Industrial Application Department.

(A) Basic Principle of Speed Estimation

Figure 1A:
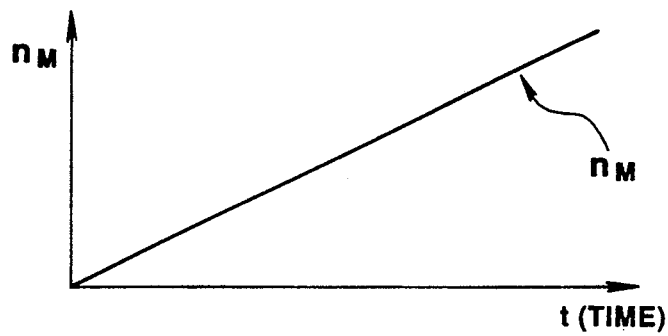
FIG. 1 (A) 1 (B), 1 (C), and 1 (D) are characteristic graphs of a encoder pulse interval variation when a rotation speed of a motor to which a previously proposed speed control system is applied is measured in an extremely low speed range.
Figure 1B:
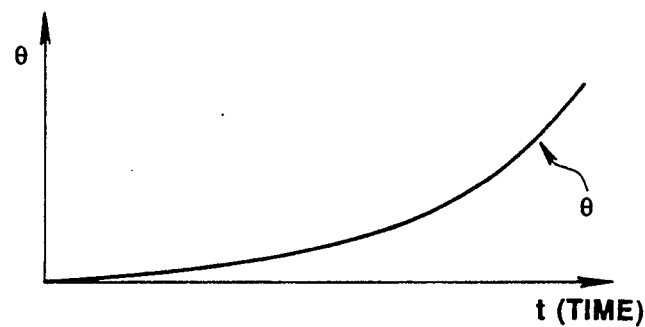
Figure 1C:
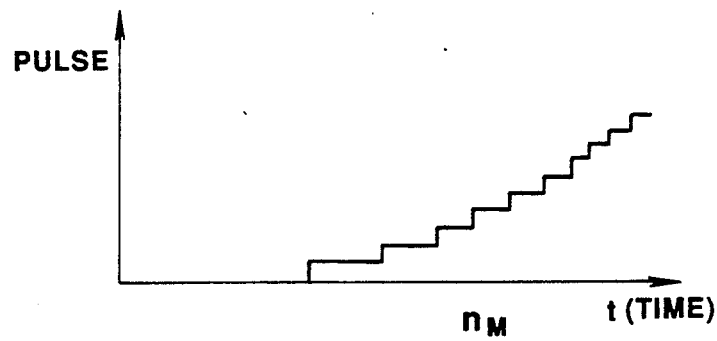
Figure 1D:
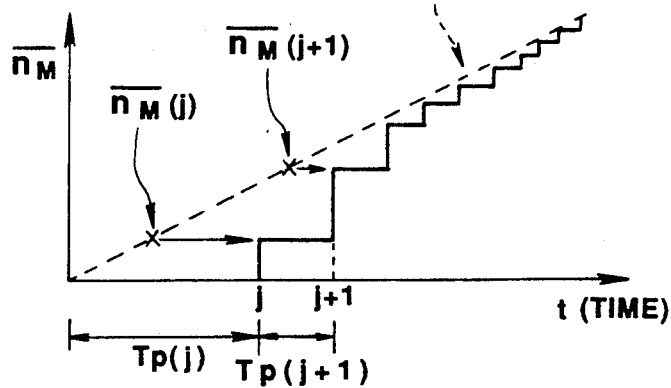
Figure 2:
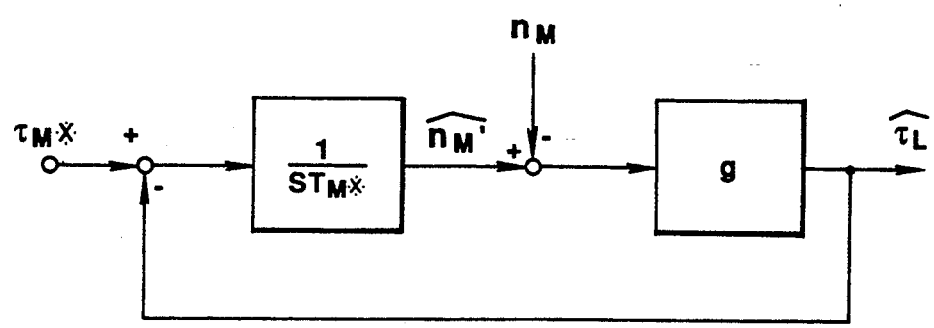
FIG. 2 is a circuit block diagram for explaining a theory of operation of a speed estimation.

FIG. 2 shows a functional structure of the load torque estimation observer by means of a least order disturbance observer. In FIG. 2, $T_M$ denotes an inertia constant of a motor model. Since an observer gain g includes only a proportional element (I) in the case of the least order disturbance observer, a deviation between a model output estimated value $n_M'(i)$ and speed $n_M$ occurs when a load torque $\tau_L$ is applied. (It is noted that if the observer is constituted by a perfect order state observer, the observer gain includes the proportion and integration elements (PI) and in a steady state, the equation as $n_M' = n_M$ is established (but in a transient state such as a load torque abrupt change the above-equation is not established). Here is the explanation of the speed estimation using the least order disturbance observer which is provided with less adjustment control gain element.

The deviation is represented by the following equations (1) and (2).

$$\tau_L = \cdot g(n_M' - n_M) \quad (1)$$

$$\therefore n_M' - n_M = 1/g \cdot \tau_L \quad (2)$$

Since the observer gain g serves as the PI (proportion-integration) element in a perfect order state observer, the model output estimated value $n_M'(i)$ equals to the speed $n_M$ in a steady state, provided that the equation is not established in a transient state, such as a load abrupt change.

In order to estimate the speed using the minimum (least) order disturbance observer in which elements to be adjusted are less, the speed can be estimated as follows when the equation (2) is modified.

$$n_M = n_M' - 1/g \cdot \tau_L \quad (3)$$

Figure 3:
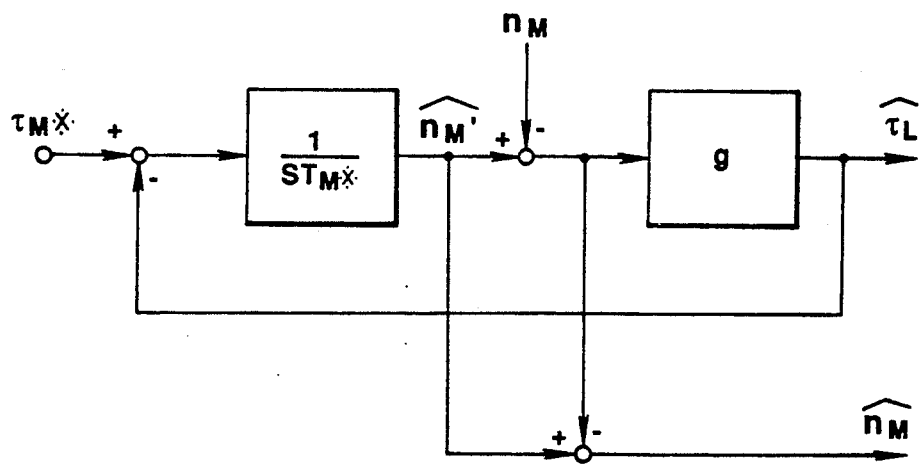
FIGS. 3 is another circuit block diagram for explaining a theory of operation of the speed estimation.

The relationship shown in the equation (3) is added to FIG. 2 and the speed is estimated from a block diagram of FIG. 3.

(B) Speed Estimation in a Zero Speed Range

When a rotary pulse encoder is used as a speed detector, an interval of time between the pulses derived from the encoder becomes longer than a speed control period (prepared from a reference clock of a microcomputer) in an extremely low speed range.

Figure 4:
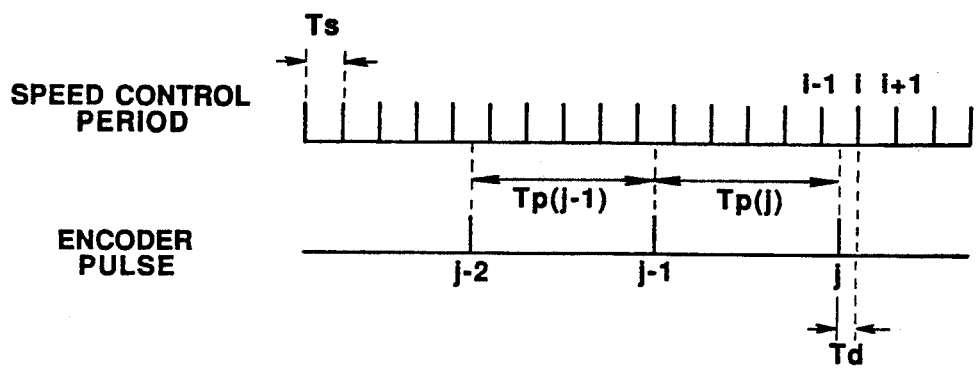
FIG. 4 is a signal timing chart for explaining a relationship between a speed control period and encoder pulse.

FIG. 4 shows the relationship between the speed control period and encoder pulse.

In FIG. 4, Ts denotes the speed control period, Tp denotes the period of the encoder pulse, and Td denotes a difference between Ts and Tp.

When the encoder pulse is input, an average value of the speed is derived from the pulse period Tp in the following equation (4).

$$n_M = 60/pp \cdot 1/Tp \quad (4)$$

wherein pp: the number of pulses per rotation of the encoder [P/R]

Tp: a period of the encoder pulses [sec.]

$n_M$: an average value of the number of rotations of the motor per minutes [rpm]

Figure 5:
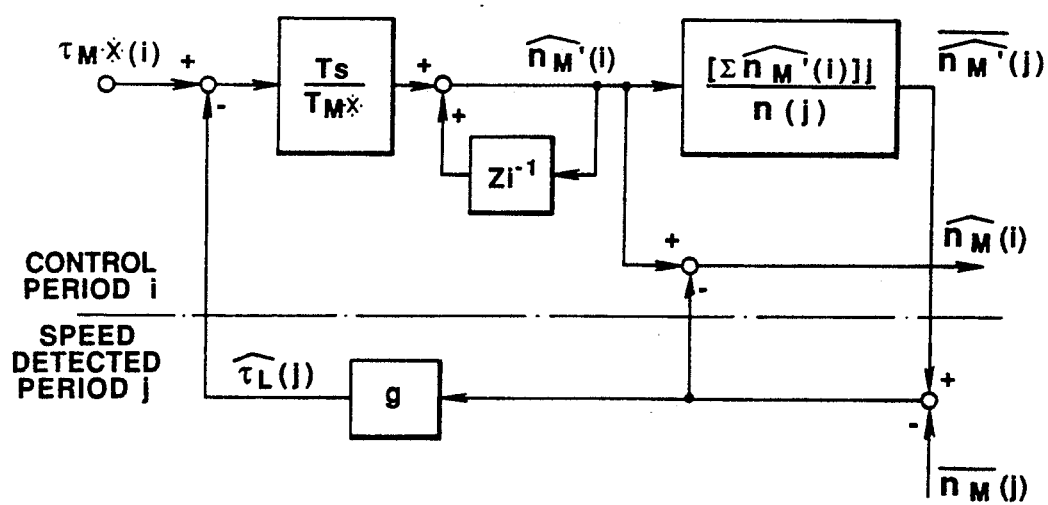
FIG. 5 is a circuit block diagram for explaining a general concept of a zero speed observer of a speed control system for a motor according to the present invention.

Since the speed detected value is detected only from the average value, the structure of the observer is constituted by a discrete system as shown in FIG. 5.

FIG. 5 shows a general structure of the zero-speed observer using the minimum (least) order disturbance observer.

The speed detected value is indicated by the average value $n_M(j)$ and the model output estimated value $n_M'(i)$ is also indicated by the average value. A deviation between the average values is used to estimate the load torque estimated value $\tau_L(j)$. The average value $n_M'(j)$ at the pulse interval is derived in the following equation (5).

$$n_M'(j) = [\Sigma n_M'(i)]/n(j) \quad (5)$$

wherein n(j) denotes the number of times the control period is advanced between Tp(j) (=Tp/Ts).

Then, described below is a first preferred embodiment using the zero-speed observer by means of the minimal order disturbance observer with reference to FIG. 6.

Figure 6:
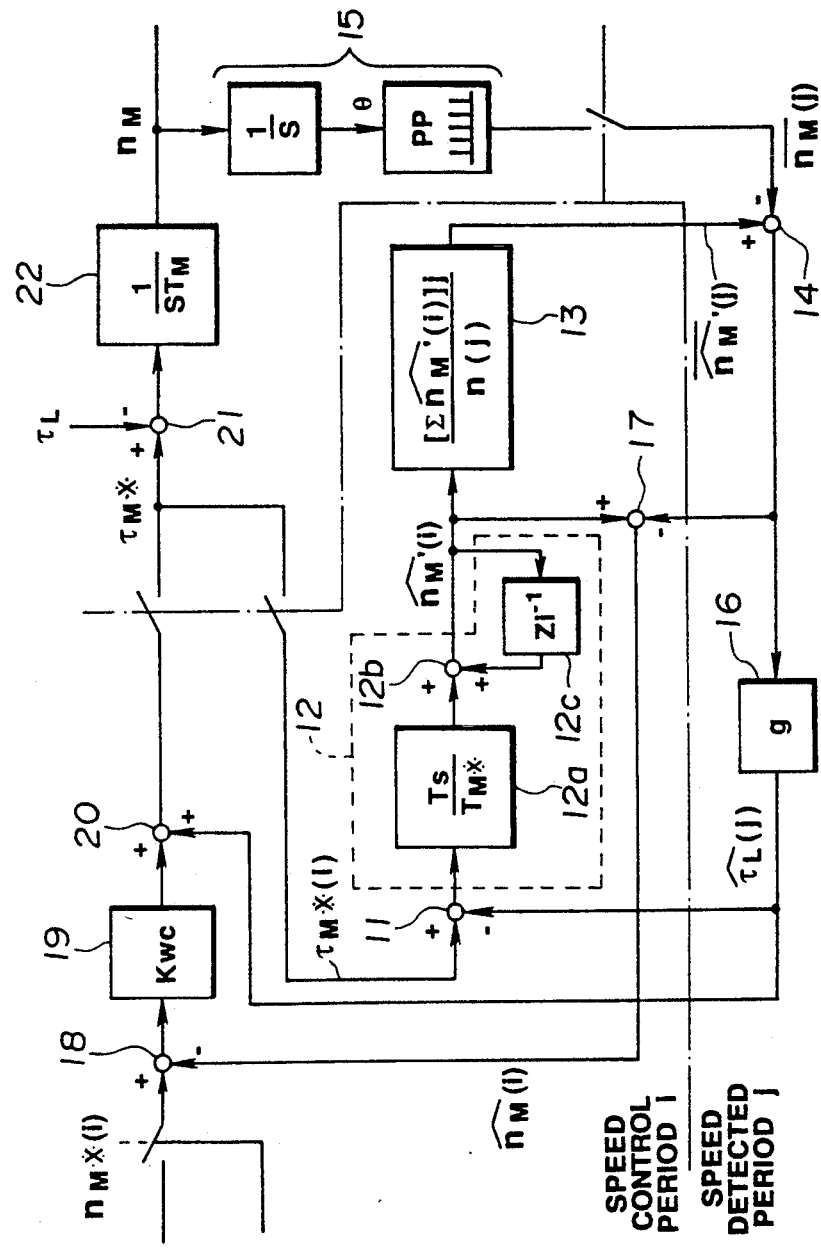
FIG. 6 is a circuit block diagram for explaining a first preferred embodiment of the speed control system for the motor according to the present invention to which the zero speed observer shown in FIG. 5 is applicable.

As shown in FIG. 6, a deviation detector, a speed amplifier, and adder are incorporated in the structure shown in FIG. 5.

In FIG. 6, the deviation detector 11 receives a torque command $\tau_M(i)$ and a load torque estimated value $\tau_L(j)$. The deviated output is supplied to a first calculating block denoted by 12. The first calculating block 12 includes: a division block 12a in which the speed control period Ts is divided with a model machine time constant $T_M$; an integrator 12c; and an adder 12b which adds an output of the division block 12a to an output of the integrator 12c.

The model output estimated value $n_M'(i)$ derived by the first calculating block 12 is supplied to a second calculating block 13. The second calculating block 13 derives the average value at the pulse intervals and outputs the calculated result denoted by $n_M'(j)$ to a plus input end of a first deviating block 14. A minus input end of the first deviating block 14 receives an average value $n_M(j)$ of the speed detection output detected by the pulse encoder 15.

The deviated output of the first deviating block 14 is supplied to an observer gain block 16 which provides a predetermined (generally proportional) gain for the input deviated value to output a load torque estimated value of $\tau_L(j)$.

In addition, the deviated output of the first deviating block 14 is supplied to a minus input end of a second deviating block 17. A plus input end of the second deviating block 17 receives the model output estimated value $n_M'(i)$. The second deviating block 17 outputs the speed estimated value $n_M(i)$. The speed deviated value $n_M(i)$ and the speed set value $n_M(i)$ are supplied to the minus input end and plus input end of a third deviating block 18. The deviated output of the third deviating block 18 is supplied to the speed amplifier 19 having a proportional gain $K_{WC}$. The adder 20 adds the output of the speed amplifier 19 to the load torque estimated value $\tau_L(j)$ to derive the torque command $\tau_M$. The torque command $\tau_M$ is supplied to a fourth deviating block 21 to derive the deviation from the load torque and is supplied to the motor, i.e., a motor model block 22.

In the first preferred embodiment, the deviation between the torque command $\tau_M$ and load torque estimated value $\tau_L(i)$ is integrated by means of the observer model machine time constant $T_M$ to derive the model output estimated value $n_M'(i)$. Next, the average value $n_M'(j)$ at the pulse intervals is derived from the value $n_M'(i)$. Thus, the deviation of $n_M'(j)$ from the average value speed $n_M(j)$ upon the change in the pulses is calculated. This deviation is multiplied by the observer gain (g) to derive a load torque estimated value $\tau_L(j)$. Thereafter, when the deviation between the observer model output $n_M'(i)$ and the output of the first deviating block 14 is subtracted to estimate the speed during the pulses so that the estimated speed $n_M(i)$ is derived. The value of $n_M(i)$ is supplied to the speed amplifier 19 as a feedback signal to carry out the speed control for the motor. It is noted that the load torque estimated value $\tau_L(i)$ is added to the output of the speed amplifier 19 by the adder 20 to derive the torque command so that a disturbance on the load can be suppressed.

In the first preferred embodiment, in a case where the motor is a direct current motor, a current detected value of an armature thereof is used for the torque command $\tau_M(i)$ and in a case where the motor is an induction motor and the speed control is a vector control, a torque current detected value is used for the torque command $\tau_M(i)$. It is noted that a command value may be used in place of each current detected value.

For the vector control for the induction motor, a U.S. Pat. No. 4,862,343 issued on Aug. 29, 1989 is exemplified, (the disclosure of which is herein incorporated by reference).

For the other speed control system of the motor, an European Patent Application Publication No. 0 333 054 is exemplified, (the disclosure of which is herein incorporated by reference).

SECOND PREFERRED EMBODIMENT

Figure 7:
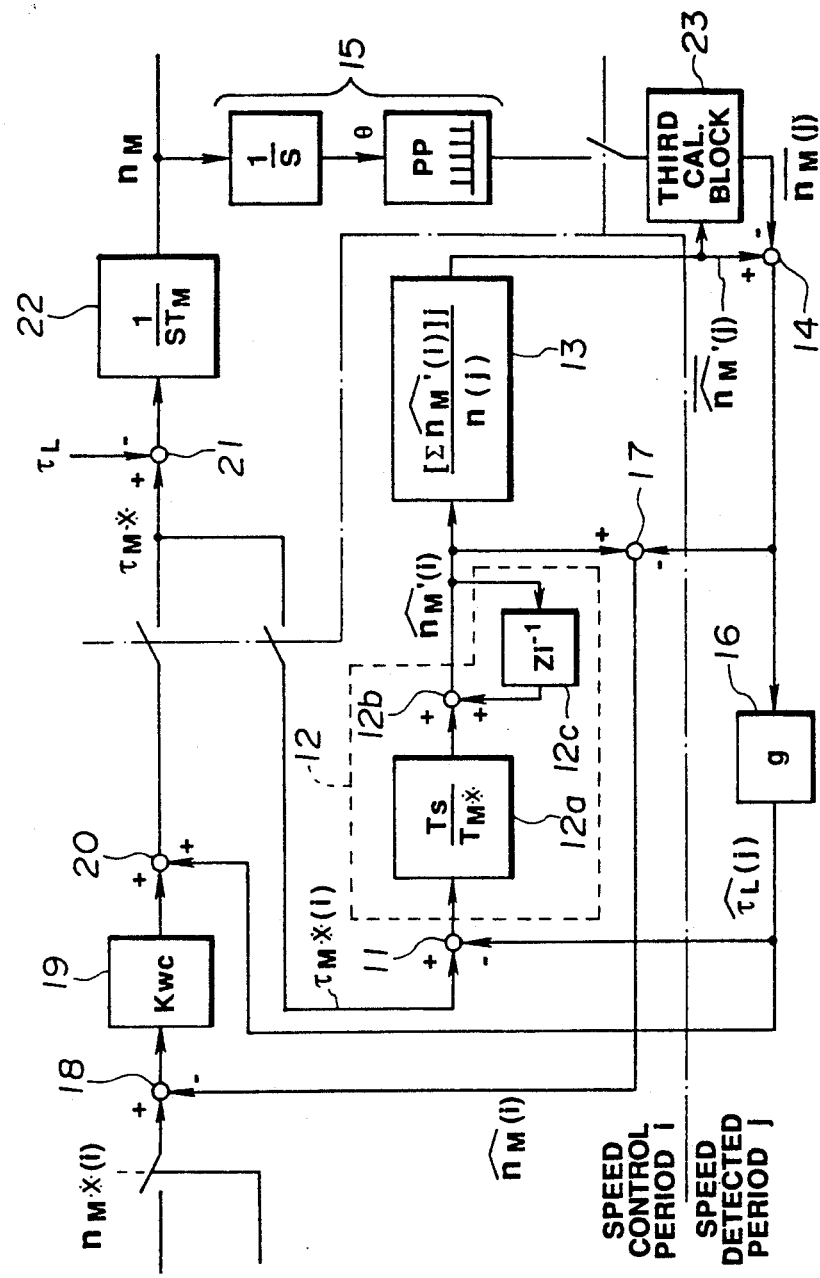
FIG. 7 is a circuit block diagram for explaining a second preferred embodiment of the speed control system for the motor according to the present invention.

FIG. 7 shows a second preferred embodiment of the speed control system for the motor 22.

Although the structure is almost the same as that of the first preferred embodiment shown in FIG. 6, a third calculating block 23 as will be described later is incorporated between the pulse encoder is and the first deviating block 14. Therefore, concentrated as described below is the explanation related to the third calculating block 23.

Figure 8:
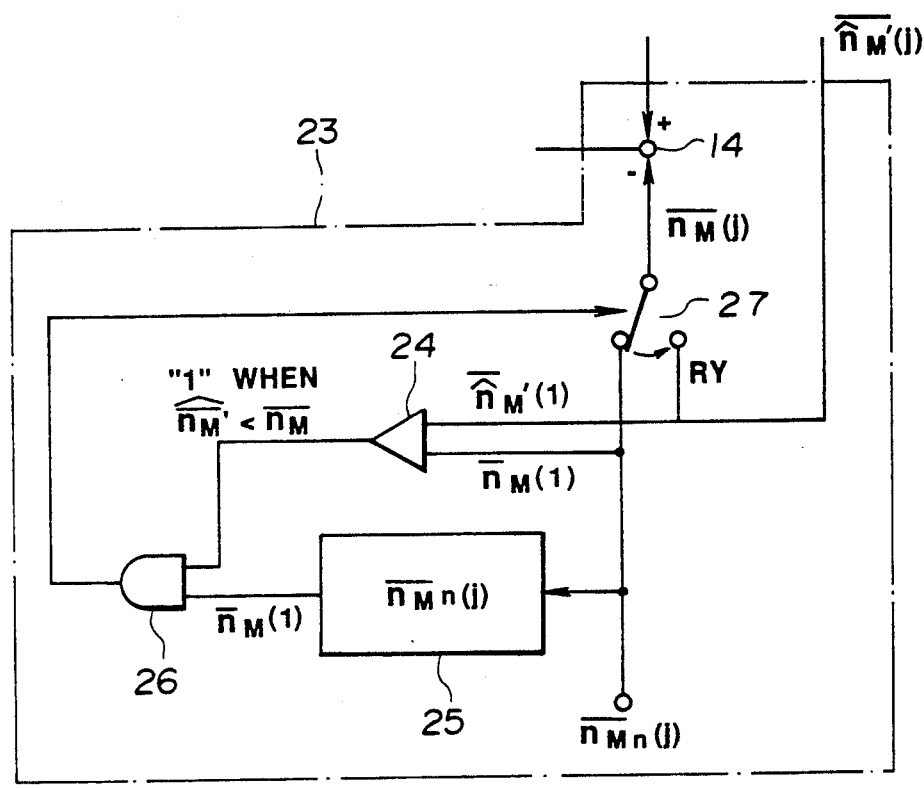
FIG. 8 is a circuit block diagram for explaining an essential part of the second preferred embodiment of the speed control system for the motor according to the present invention.

FIG. 8 shows an internal circuit block diagram of the third calculating block 23.

The third calculating block 23 includes: a comparator 24 which compares a magnitude of a first output $n'_{M1}$ of the output $n'_M(j)$ calculated by the third calculating block 13 with that of a first pulse output $n_{M1}$ of the average value $n_M(j)$ transmitted from the pulse encoder 15; a pulse output check block 25 to check or confirm the first pulse output of the average value $n_M(j)$; an AND circuit 26 receiving the output of the check block 25 and output of the comparator 24; an AND circuit 26 which receives the outputs of the check block 25 and the comparator 24; and a switching contact 27 of a relay (not shown ) operating an ANDed output of the AND circuit.

Next, the operation of the third calculating block will be described below.

Normally, the relay contact 27 is connected as shown in FIG. 8 and the average value $n_M(j)$ is supplied to the first deviating block 14.

When the comparator 24 determines that $n_{M1}' < n_{M1}$, the output of the comparator 24 indicates "1".

On the other hand, when the cheek block 25 confirms that it is the first pulse, the output of the check block 25 indicates "1" and is supplied to the AND circuit 26. Since the AND circuit 26 receives both "1"s, the AND circuit 26 outputs the ANDed output to energize the relay so that the switching relay contact 27 is, in turn, temporarily switched to an opposing contact different from that shown in FIG. 8.

Consequently, the output of the second calculating block 13 is supplied to both input ends of the first deviating block 14 and the deviation becomes zero. Therefore, since an influence of the first pulse due to an error of an initial position of the encoder is eliminated, a driving stability becomes high even when the motor is started and driven at an extremely low speed.

THIRD PREFERRED EMBODIMENT

A third preferred embodiment of the speed control system will be described below.

It is noted that the structure of the third preferred embodiment is almost the same as that in the second preferred embodiment including the third calculating block 23.

However, since the structure of the third calculating block is different from that shown in FIG. 8, the explanation of the third calculating block 23 is concentrated to the structure and operation of the third calculating block 23 in the third preferred embodiment.

Figure 9:
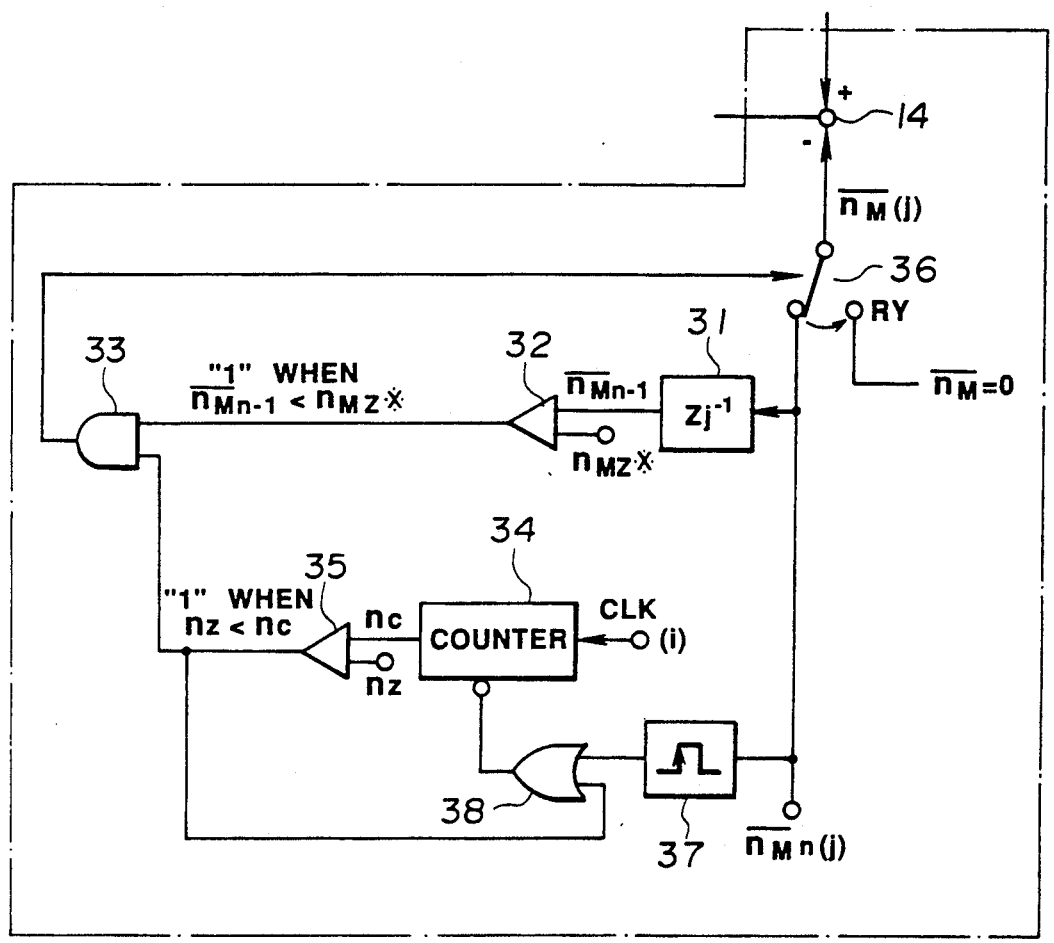
FIG. 9 is a circuit block diagram for explaining an essential part of a third preferred embodiment of the speed control system for the motor according to the present invention.

FIG. 9 shows the structure of the third preferred embodiment of the third calculating block 23.

In FIG. 9, an integrator 31 is provided for integrating an average value $n_{Mn}(j)$ of the speed detected value and outputting the integrated value $n_{Mn-1}$.

The value of $n_{Mn-1}$ is supplied to one input end of a comparator 32, the other input end thereof receiving a value $n_{MZ}$ in a zero speed range of, e.g., 1/2000 of the rated speed. When $n_{Mn-1} < n_{MZ}$, the comparator 32 outputs a bit value of "1" to a first input end of the AND circuit 33. Numeral 34 denotes a counter which counts the speed control period signal (i) to derive the corresponding count output $n_c$. The counted output $n_c$ is supplied to one input end of a comparator 35. The other input end of the comparator 35 receives a zero-speed count value $n_Z$ (for example, a count value which is longer than a signal period Tp multiplied by four of the encoder pulse when the speed of the motor is 1/2000 rated speed).

When $n_z < n_c$, the comparator 35 outputs "1". The output of "1" from the comparator 35 is supplied to a second input end of an AND circuit 33. The AND circuit 33 outputs the ANDed output when both first and second input ends indicate "1" so that a relay (not shown) is energized and a switching contact 36 is switched to an opposing contact different from that shown in FIG. 9. It is noted that numeral 37 denotes a rising edge detector, e.g., constituted by a monostable multivibrator and numeral 38 denotes an OR circuit 38.

In the third preferred embodiment, when the pulse input from the encoder is not changed for a constant period of time ( a time longer than the 4-multiplied signal period Tp at, e.g., 1/2000 speed) when the motor rotates at the zero speed range (1/2000 or below of the rated speed), $n_M = 0$ and it is supplied to the first deviating block 14.

Thereby, when the calculations of speed estimation observer and the speed control system are executed, the return to the speed set value can be fastened.

Such a state as described above is generated when the load torque is changed in an extremely low speed range.

In the second and third preferred embodiments, the deviation between the torque command $\tau_M$ and load torque estimated value $\tau_L$ (i) is integrated by means of the observer model machine time constant $T_M$ to derive the model output estimated value $n_M'(i)$. Next, the average value $n_M'(j)$ at the pulse intervals is derived from the value $n_M'(i)$. Thus, the deviation from the average value speed $n_M(j)$ upon the change in the pulses. This deviation is multiplied by the observer gain (g) to derive a load torque specified value $\tau_L(j)$. Thereafter, when the deviation between the observer model output $n_M'(i)$ and the output of the first deviating block 14 is subtracted to estimate the speed during the pulses so that the estimated speed $n_M(i)$ is derived. The value of $n_M(i)$ is supplied to the speed amplifier 19 as a feedback signal to carry out the speed control for the motor. It is noted that the load torque estimated value $\tau_L$ (j) is added to the output of the speed amplifier 19 by the adder 20 to derive the torque command so that a disturbance on the load can be suppressed.

Furthermore, in the second and third preferred embodiments, in a case where the motor is a direct current motor, a current detected value of an armature thereof is used for the torque command $\tau_M(i)$ and in a case where the motor is an induction motor and the speed control is a vector control, a torque current detected value is used for the torque command $\tau_M(i)$. It is noted that a command value may be used in place of each current detected value.

FOURTH PREFERRED EMBODIMENT

Figure 10:
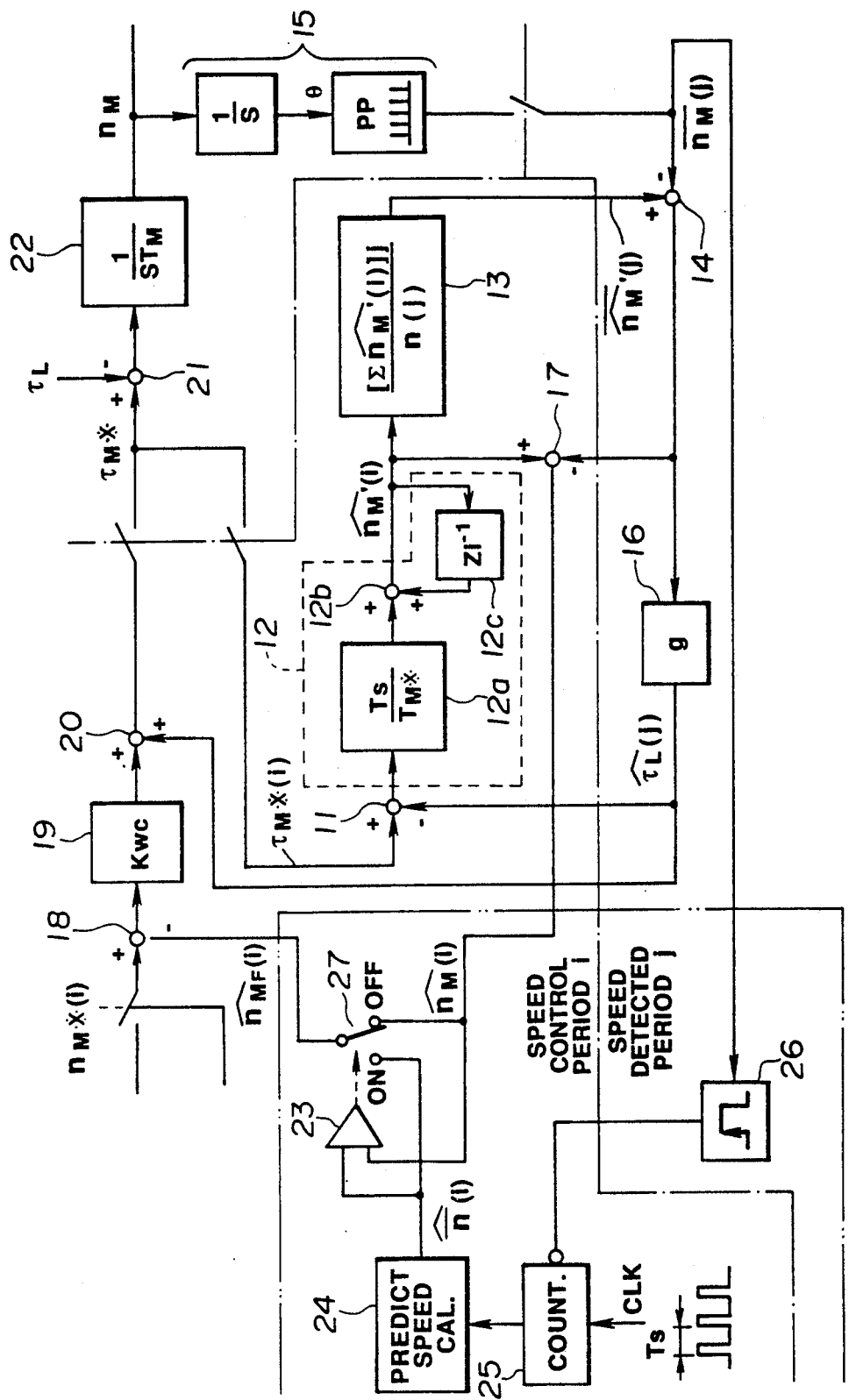
FIG. 10 is a circuit block diagram for explaining a fourth preferred embodiment of the speed control system for the motor according to the present invention.

FIG. 10 shows a fourth preferred embodiment of the speed control system according to the present invention.

As shown in FIG. 10, the difference from the structure of the first preferred embodiment is denoted by a dot, dot-and-dash (phantom) line.

Therefore, the explanation of the fourth preferred embodiment will be concentrated to an internal structure denoted by the phantom line of FIG. 10.

That is to say, the speed estimated value derived from the second deviating block 17 is supplied to a first input end of the comparator 23 which is operated when the speed of the motor falls in the extremely low speed range.

It is noted that a second input end of the comparator 23 receives a predicted speed value derived from a predicted speed calculating block 24.

Then, the predicted speed calculating block 24 carries out the following equation (6):

$$n(i) = 60/pp \cdot 1/i \cdot T_s \text{[rpm]} \qquad (6)$$

wherein pp: the number of pulses per rotation of the encoder n(i): predicted speed Ts: speed control period A counter 25 counts the speed control period pulse Ts and is reset in response to a rising edge of the speed detected pulse (period is Tp) detected by a rising edge detector 27 (,e.g., a f lip -flop). Hence, the counter 25 outputs the counted result to the predicted speed calculator 24 until it is reset. The comparator 23 compares the predicted speed and speed estimated value. When the speed estimated value is larger than the predicted speed, the output from the comparator 23 is supplied to switch a switching contact 27 of the relay from the on state to the off state. When the speed estimated value is equal to or smaller than the predicted speed value, the switching contact 27 is switched from the on position to the off position. At this time, when the minus input end of the third deviating block 18 receives the predicted speed value via the switching contact 27 when the motor speed falls in the extremely low speed range. On the other hand, a plus input end of the third deviating block 18 receives the speed set value $n_M(i)$ and the deviated output of the third deviating block 18 is supplied to the speed amplifier 19 having the proportional gain $K_{WC}$. The output of the speed amplifier 19 and load torque estimated value are added to the adder 20 to derive the torque command $\tau_M$.

The torque command $\tau_M$ receives the deviation from the load torque by means of the fourth deviating block 21 and is supplied to the motor 22 to execute speed control thereof. It is noted that since in a high speed range of the motor 22 the predicted speed in the equation (6) is extremely higher than the actual speed, the switching contact 27 of the relay remains in the off state.

In the fourth preferred embodiment, the deviation between the torque command $\tau(i)$ and load torque estimated value is integrated with respect to the observer model machine time constant $T_M$ to derive the model output estimated value.

Next, when the average value at the pulse interval is derived from the estimated value derived by the integrator 12c and the deviation between the average value at the pulse interval of time and the speed average value derived upon the change in the pulses is calculated. This deviation therebetween is multiplied by the observer gain g to derive the load torque estimated value. Thereafter, the deviation between the output estimated value of the observer model and first deviating block 14 is derived in the second deviating block 17 so as to estimate the speed between the pulses so as to derive the speed estimated value.

The speed estimated value is supplied to the first input end of the comparator 23. When the speed estimated value equals to or smaller than the predicted speed value of the predicted speed calculating block 24 to be supplied to the second input end of the comparator 23, the relay switching contact 27 is switched from the on state to the off state. When the speed estimated value is higher than the predicted speed value, the switching contact 27 of the relay is switched to the ON position as different from FIG. 10.

Figure 11:
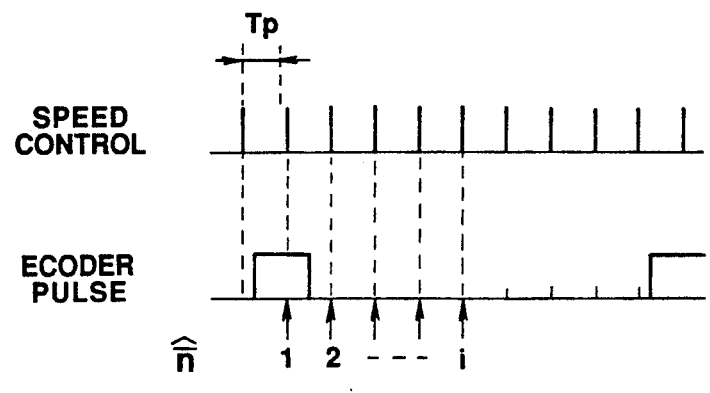
FIG. 11 is a signal timing chart for explaining a relationship between the speed control period and encoder pulse in the fourth preferred embodiment shown in FIG. 10.

FIG. 11 shows the relationship between the speed control period and encoder pulses.

As shown in FIG. 11, when the i number of times the calculation of the equation (6) is executed, the predicted speed becomes higher than the real speed n.

That is to say, if the actual speed n < the predicted speed < speed estimated value, the switching output of the relay is supplied from the comparator 23 so that the switching contact 27 is switched to the on position as is different from FIG. 10.

Consequently, the minus input end of the third deviating block 18 receives, in turn, the predicted speed value in place of the estimated speed value.

Figure 12:
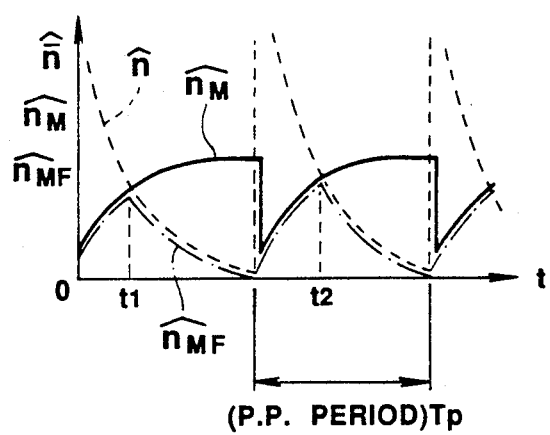
FIG. 12 is a characteristic graph of the estimated speed when the speed estimated value is corrected by means of a predicted speed calculated as shown in FIG. 11.

FIG. 12 shows the situations in the third deviating block 18 described above.

In FIG. 12, a solid line indicates a curved line of the speed estimated value, a broken line indicates a curved line of the predicted speed, and a dot-dash-and-dot line indicates a curved line when the speed predicted value is modified.

Hence, although the motor is, at the first time, driven in accordance with the curve of the speed estimated value, the motor is driven in accordance with the speed denoted by the dot-and-dash line of FIG. 12 (the same as the predicted speed) when the speed estimated value is higher than the predicted speed value (times $t_1$ and $t_2$). Therefore, the motor is started more smoothly.

As shown in FIG. 12, since the counter 25 is reset according to the speed detected period Tp, the speed of the motor is gradually increased.

FIFTH PREFERRED EMBODIMENT

Figure 13:
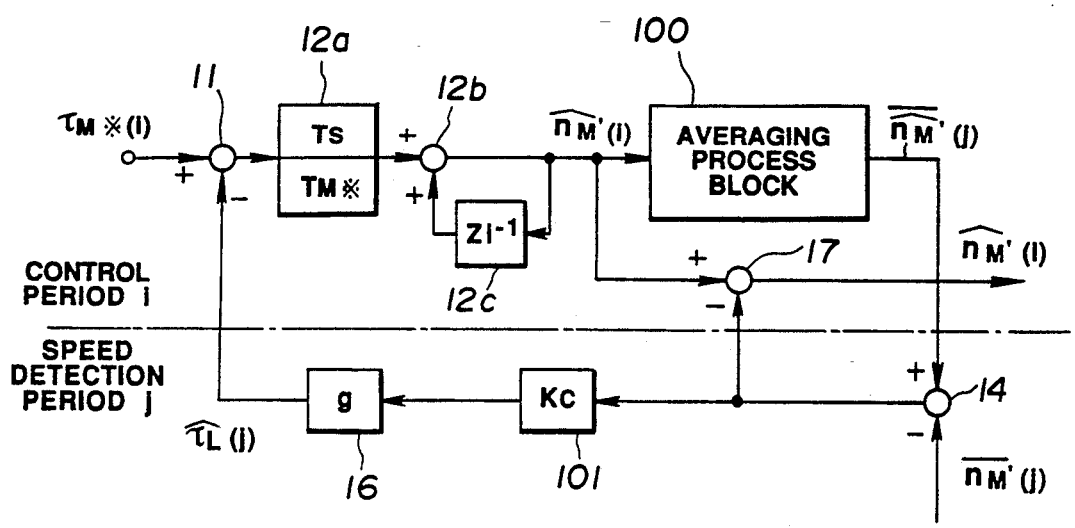
FIG. 13 is a circuit block diagram for explaining a fifth preferred embodiment of the speed control system according to the present invention.

FIG. 13 shows a fifth preferred embodiment of the zero speed observer according to the present invention.

It is noted that the whole circuit block diagram of the zero speed observer in the fifth preferred embodiment substantially corresponds to FIG. 6 of the first preferred embodiment.

However, the difference from FIG. 6 is that the averaging process block 100 in FIG. 13 is different from that denoted by 13 in FIG. 6 and a variable gain block 101 is interposed between the first deviation block 14 and observer gain block 16.

That is to say, first, the avaraging process block 100 will be described below.

In the speed estimating method using the least order load torque estimation observer, the speed information which can be detected whenever the output signal from the pulse encoder is derived is the speed average value $n_M$ between the output signals from the pulse encoder.

Therefore, the output estimated value of the observer model $n_{M'}(i)$ is also used to derive its average value $n_{M'}(j)$ at a time between the output signals of the pulse encoder and the load torque estimation value $\tau_L(j)$ is estimated according to the deviation between $n_M(j)$ and $n_{M'}(j)$.

In the extremely low speed range, the pulse interval Tp(j) shown in FIG. 4 becomes long and the number of speed control period n(j) (cycle or frequency the control period is repeated) becomes large. Therefore, an effect of a deviation in timings between i and j (for example, Td) on the average value is minor so that the average value $n_{M'}(j)$ of the model output estamated value $n_{M'}(i)$ can be approximated to the equation (5) described above.

However, when the speed becomes increased as compared with the extremely low speed range described above, the pulse interval Tp(j) of the output signal of the encoder is shortened and the cycle of the control period n(j) is decreased. In this case, it is necessary to consider the timing deviation between i and j so as to achieve an accurate average value $n_{M'}(j)$ of the model output estimated value $n_{M'}(i)$.

Figure 15:
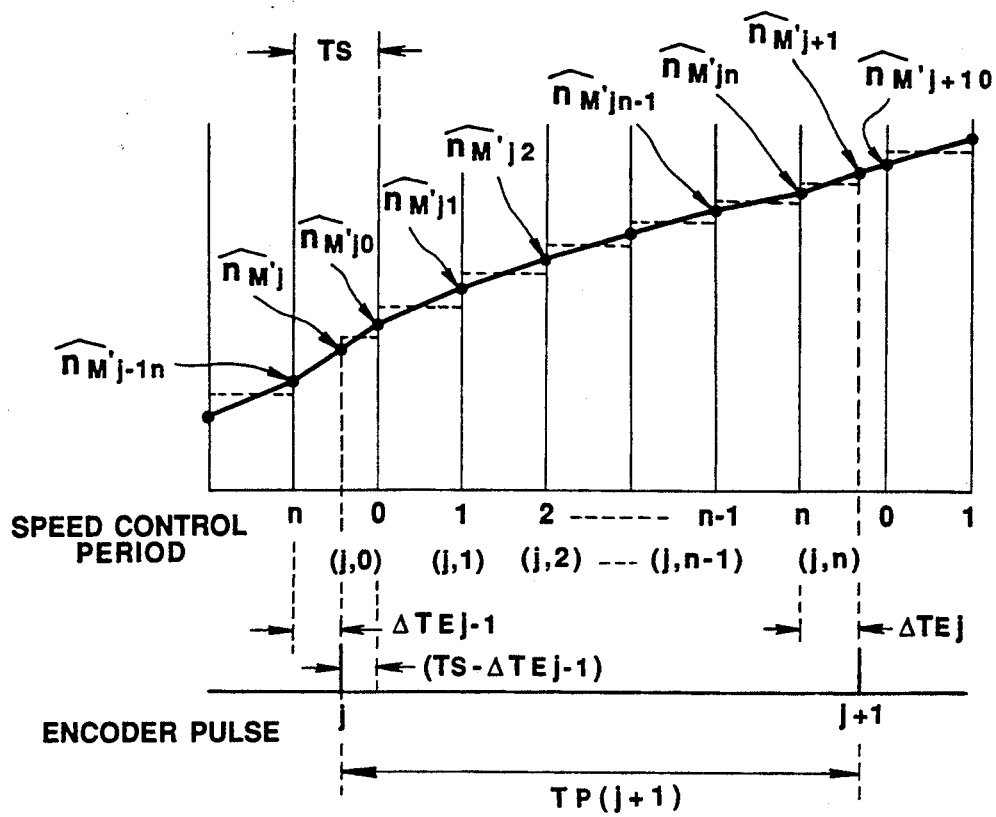

FIG. 15 shows an explanatory view of a method for driving the average value $n_{M'}(j)$.

It is noted that for explanation purpose the time between j and (j+1) will be explained.

It is also noted that as appreciated from FIG. 15, the average value $n_{M'}(j)$ is derived from the average value for each speed control period whose total sum of areas is divided by a time.

First, the average value from the time (j, O) to (i, n) is derived in the following equation:

$$n_{M'j0 \sim jn} = \frac{\frac{n_{M'j0} + n_{M'j1}}{2}}{n} \quad (7)$$

$$+ \frac{\frac{n_{M'j1} + n_{M'j2}}{2}}{n}$$

$$+ \frac{\frac{n_{M'jn-1} + n_{M'jn}}{2}}{n}$$

$$= \frac{\sum_{k=0}^{k=n-1} \{(n_{M'jk} + n_{M'jk+1})/2\}}{n}$$

In the equation (7), $n_{M'}$ j0, - - -, $n_{M'}$ jn denote model output, estimated values of (j, 0) through (j, n) number; and $n_{M'}$ jo~jn denotes the average value.

The average values at the deviation timing interval between the encoder pulse signal j and speed control period i ($Ts-\Delta T_{Ej-1}$) and $\Delta T_{Ej}$ are derived.

The following is the explanation of deriving the average value between $T_{Ej}$.

Figure 14:
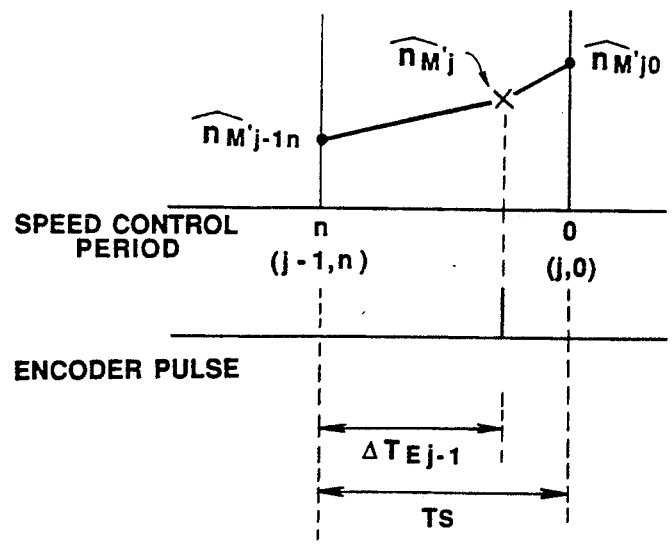
FIGS. 14, 15, and 16 are explanatory views for explaining averaging processes of the averaging process block 100 shown in FIG. 13.

As shown in FIG. 14, until the encoder pulse signal is received at the time of (j+1), the torque estimated value $\tau_{L(j)}$ estimated at the time of j is used to estimate the model output estimated value $n_{M'}(i)$.

Hence, the average value $n_{M'j+1}$ at the time of (j+1) is derived from the following equation:

$$n_{M'j+1} = N_{M'jn} + \Delta T_{Ej}/T_M \ \{\tau_M \ jn - \tau_L(j)\} \quad (8)$$

However, it is noted that, according to the torque command value $\tau_{Mjn}$ at (j, n), the average value $n_{M'}$ between $\Delta T_{Ej}$ is derived from the following equation (9).

$$n_{M'}\Delta T_{Ej} = (n_{M'jn} + n_{M'j+1})/2 \quad (9)$$

Next, the average value $n_{M'\ j+10}$ will be derived as follows. That is to say, when the encoder pulse is input to the averaging process block 100, the torque estimated value $\tau_{L(j+1)}$ at the time of (j+1) is derived.

The average value $n_{M'\ j+10}$ is derived as expressed in the following equation (10).

$$n_{M'j+10} = n_{M'j+1} + (Ts - \Delta T_{Ej})/T_M \ \cdot \{T_M \ jn - \tau_L(j + 1)\} \quad (10)$$

As described above, when the encoder pulse (j+1) is input, the calculation by the block portion divided by i shown in FIG. 5 may be executed at the speed control period. It is, however, noted that a coefficient $Ts/T_M$ of the model integration time constant should be replaced with $\Delta T_{Ej}/T_M$.

In addition, the calculation by the block portion divided by i shown in FIG. 5 may be executed at the speed control period to be next executed after the time (i+1). At this time, the coefficient $Ts/T_M$ of the model integration time constant should be replaced with $(Ts - \Delta T_{Ej})/T_M$.

Figure 16:
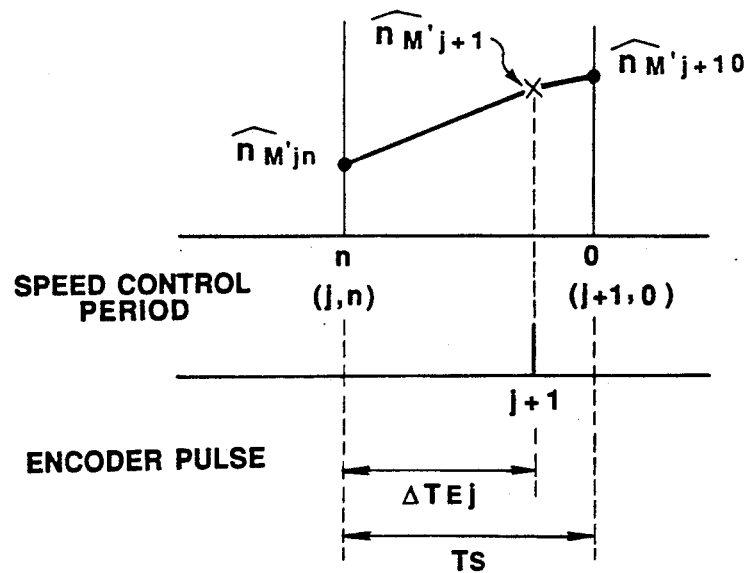

Referring to FIG. 16, the average value $n_{M'}(Ts \Delta T_{Ej-1})$ between $(Ts - \Delta T_{Ej-1})$ can be derived from the following equations.

$$n_{M'j} = n_{M'j-1n} + \Delta T_{Ej-1}/T_M \ \cdot \{\tau_M \ j-1n - \tau_L(j-1)\} \quad (11)$$

$$n_{M'j0} = n_{M'j} + (Ts - \Delta T_{Ej-1})/T_M \ \cdot \{\tau_M \ j-1n - \tau_L(j)\} \quad (12)$$

$$n_{M'}(Ts - \Delta T E_{j-1}) = (n_{M'j} + n_{M'j0})/2 \quad (13)$$

As described above, the average value $n_{M'(j+1)}$ of the model output estimated value $n_{M'(i)}$ between $T_{p(j+1)}$ can be derived from the following equation (14).

$$n_{M'(j+1)} = \frac{\{n_{M'}(Ts - \Delta T_{Ej-1}) \cdot (Ts - \Delta T_{Ej-1})}{(Ts - \Delta T_{Ej-1}) + n \cdot Ts + \Delta T_{Ej} +} \\ \frac{n_{M'j0-jn} \cdot n \cdot Ts + n_{M'}\Delta T_{Ej} \cdot \Delta T_{Ej}\}}{} \quad (14)$$

Consequently, when using the equation (14) the deviation of the timing between the speed control period signal i and speed detection period signal j can be compensated and the observer model output average value $n_{M'(j)}$ can accurately be calculated.

Next, the improvement of the observer gain will be described below.

If the observer gain g shown in FIG. 5 is set to a higher value with suppression of disturbance in a state where the encoder pulse is obtained during the speed control period taken into consideration, the speed control system becomes unstable under such a condition that the encoder pulse interval Tp(j) is elongated as in the extremely low speed range described above. Therefore, since the observer gain g cannot be set to the higher value any more with the low speed range taken into account, the effect of suppresion on disturbance at the higher speed range can conversely be reduced.

To cope with such inconvenience as described above, the observer gain g should be variable. Suppose that the observer gain in a state where the encoder pulse is derived during the speed control period is denoted by g. As the speed range is in the low speed range, a variable gain Kc when no encoder pulse is not derived during the speed control period is derived from the following equation (15).

$$Kc = Ts/\{(Ts - \Delta TE_{j-1}) + n \cdot Ts + \Delta TE_j\} \quad (15)$$

The equation (15) represents a ratio between the encoder pulse interval Tp(j+1) and speed control period Ts and the observer gain becomes reduced as the speed becomes low.

It is, then, noted that if, approximately, the deviation of the timing between i and j is neglected, the equation (15) represents the observer gain Kc.

$$Kc = 1/n \quad (16)$$

Referring back to FIG. 13, numeral 100 denotes the averaging process block which is an improvement of the second calculating block 13 in FIG. 6. The averaging process block 100 calculates the equation (14). The averaged output from the averaging process block 100 is supplied to the plus input end of the first deviation block 14, the minus input end thereof receiving the average value $n_M(j)$ of the speed detection output detected from the pulse encoder 15.

The deviated output of the first deviating block 14 is supplied to the variable gain (Kc) block 101 to execute the equation (15). As the speed becomes low, the gain is reduced so that the observer gain is supplied from the variable gain block 101 to the observer gain block 16. Thereafter, the same operation as in the first preferred embodiment is carried out.

EFFECTS EXHIBITED BY THE PRESENT INVENTION

According to the present invention, since the speed estimation becomes possible in situations where the pulse interval of the encoder becomes longer than the speed control period and no accurate information of the speed can be obtained any more in the extremely low speed range of the speed control system using the rotary pulse encoder for the speed detector, the speed control in the extremely low speed range can stably be achieved with a fast responsive characteristic. Since the least order observer for the load torque estimation is used and a single adder is used, the elements to be adjusted becomes less (for example, only observer gain and model machine time constant) so as to make easy adjustment possible.

Since the low cost rotary pulse encoder with less resolution can be used, the manufacturing cost of the speed control system can be reduced.

In addition, since the accurate average speed can be achieved although the initial position error is present in the encoder, the motor can be started and driven stably at the extremely low speed range.

Furthermore, since a perceptive balance state between the speed estimated value and speed estimated value is eliminated, the rising of the real speed can be fastened and the speed control at the extremely low speed range can be smoothed during the motor start.

Various effects other than described above can be achieved according to the present invention.

It will fully be appreciated by those skilled in the art that the foregoing description has been made to the preferred embodiment and various changes and modifications may be made without departing from the scope of the present invention which is to be defined by the appended claims.

What is claimed is:

1. A system for controlling speed of a motor, comprising:
    a) an electric motor;
    b) a speed detector attached around a rotation axle of the electric motor for detecting a rotation speed of the motor and producing and outputting a series of pulses according to the detected rotation speed; and
    c) a motor speed estimation observer constituted by at least order state observer which is effective when a period (Tp) of the pulses derived from said speed detector is longer than a control period (Ts) of the whole system, said motor speed estimation observer including: a first calculating block which receives a deviation between a torque command value ($\tau_{M^*}(i)$) and a motor load torque estimated value ($\tau_L(j)$) and integrates the deviation with an observer model machine time constant ($T_{M^*}$) so as to output a model output estimated value ($n_M'(i)$); a second calculating block which derives an average value ($n_M'(j)$) at the pulse interval (j) from the model output estimated value of the first calculating block; a first deviating block which derives a deviation between the output value of the second calculating block and an average value ($n_M(j)$) of motor speed derived whenever any one of the pulses is output from the speed detector; and an observer gain block which multiplies the deviated value derived from the first deviation block by an observer proportional gain (g) so as to derive the motor load torque estimated value ($\tau_L(j)$); a second deviating block which derives a deviation ($n_M(i)$) between the output model estimated value of the first calculating block and the deviated value of the first deviating block; a speed amplifier (Kwc) which receives a deviated value from the second deviating block and a speed set value ($n_{M^*}(i)$) and derives a deviation between the deviated value of the second deviating block and the speed set value, amplifying the deviation by a predetermined gain; and a first adder located at the subsequent stage of the speed amplifier which adds an output amplified value of the speed amplifier and the motor load estimated value ($n_M(i)$).

2. A system for controlling a motor speed as set forth in claim 1, which further includes:
    a third deviating block which derives a deviation between the torque command ($\tau_M(i)$) at the present control period (i) and the load torque estimated value ($\tau_L(j)$) derived from the observer gain block at the present detector pulse period (j), and wherein said first calculating block includes: a division block which divides the control period Ts by a model time constant $T_M$ as $Ts/T_M$; an integrator which integrates the quantity as $Zi^1$; and a second adder which adds an output value of the division block to an output integrated value of the integrator to output the motor speed estimated value $n_M'(i)$.

3. A system for controlling a motor speed as set forth in claim 2, wherein said second calculating block calculates as follows:

$$n_M'(j) = [\Sigma n_M'(i)]/n(j).$$

4. A system for controlling a motor speed as set forth in claim 3, wherein said first deviating block calculates as follows: $n_M'(j) - n_M(j)$ and the deviated value thereof is supplied to a minus input end of the second deviating block and an input end of the observer gain block.

5. A system for controlling a motor speed as set forth in claim 3, wherein said second deviating block calculates as follows:

$$n_M(i) = n_M'(i) - n_M'(j) + n_M(j)$$

and wherein the deviated value of said second deviating block is supplied as a feedback signal of the detected speed value to a minus input end of a fourth deviating block which deviates between the speed set value ($n_M(i)$) and the deviated value $n_M(i)$ from the second deviating block.

6. A system for controlling a motor speed as set forth in claim 5, wherein said speed amplifier amplifies the deviated value of the fourth deviating block with the predetermined gain of $K_{WC}$ and supplies the amplified output to the first adder.

7. A system for controlling a motor speed as set forth in claim 6, wherein said first adder derives the torque command $\tau_M(i)$ from the addition result of the amplified output of the speed amplifier to the estimated load torque value $\tau_L(j)$ from the third deviating block.

8. A system for controlling a motor speed as set forth in claim 7, which further includes a fifth deviating block which deviates between a load torque $\tau_L$ and the load torque command $\tau_M$ and supplies the deviated output value to the motor.

9. A system for controlling a motor speed as set forth in claim 8, wherein said speed detector is a rotary pulse encoder and the average value of the motor speed is calculated as follows:

$n_M = 60/\text{pp}.1/\text{Tp}$, wherein pp denotes the number of pulses per rotation of the pulse encoder, Tp denotes a period of the generated pulses from the pulse encoder, and $n_M$ denotes the average value of the motor speed.

10. A system for controlling a motor speed as set forth in claim 9, which further includes a third calculating block which compares the average speed value derived from the second calculating block with the average speed value derived on the basis of the output pulses from the speed detector when any one of the pulses from the speed detector is generated and provides the average speed value derived from the second calculating block for both plus and minus input ends of the first deviating block.

11. A system for controlling a motor speed as set forth in claim 10, wherein said third calculating block includes: a comparator which compares a first pulse input $n_M'(1)$ of the average estimated speed value $n_M'(j)$ derived from the second calculating block with a first pulse input $n_M(1)$ of the average speed value $n_M(j)$ derived on the basis of the output pulses of the pulse encoder and outputs a predetermined bit when $n_M'(1) < n_M(1)$; a pulse checker which monitors the pulses derived from the pulse encoder and outputs only the first pulse $n_M(1)$; AND circuit which takes a logical AND from both predetermined bit output from the comparator and $n_M(1)$; and a relay contact which connects the output estimated speed value signal $n_M'(j)$ of the second calculating block to the minus input end of the first deviating block in response to a logical AND signal from the AND circuit.

12. A system for controlling a motor speed as set forth in claim 9, which further includes a third calculating block which determines whether none of the pulses derived from the pulse encoder is generated for a predetermined period of time when the motor speed falls in a predetermined zero speed range and determines that the average value derived on the basis of the pulses from the pulse encoder is zero when determining that none of the pulses derived from the pulse encoder is generated for a predetermined period of time during the motor speed falling in the predetermined zero speed range so that the first deviating block outputs the average value derived from the second calculating block $n_M'(j)$.

13. A system for controlling a motor speed as set forth in claim 12, wherein said third calculating block includes: integrator which integrates the average value $n_Mn(j)$ derived on the basis of the output pulses of the pulse encoder to derive the integrated output $n_Mn$-1; a first comparator which compares the integrated output $n_Mn$-1 with a reference value $n_{MZ^*}$ corresponding to the predetermined period of time and outputs a predetermined bit when $n_Mn$-1 $< n_{MZ^*}$; a counter which counts the number of pulses from a reference clock indicating the control period (i) and which is reset when a pulse indicating the average value $n_Mn(j)$ derived on the basis of the output pulses of the pulse encoder rises; a second comparator which compares the counted output $n_c$ of the counter with a zero speed count value $n_z$ and outputs the predetermined bit when $n_z < n_c$; an OR circuit which takes a logical OR between the rising pulse used to reset the counter and the predetermined bit; and AND circuit which takes a logical AND between both predetermined bits from the respective first and second comparators; and a relay contact which connects a terminal indicating that $n_M = 0$ to the minus input end of the first deviating block in response to an output AND signal of the AND circuit.

14. A system for controlling a motor speed as set forth in claim 13, wherein said reference value $n_{MZ^*}$ of the first comparator indicates the average value of the motor speed.

15. A system for controlling a motor speed as set forth in claim 14, wherein said zero speed count value $n_z$ represents a count value of the counter which indicates longer than that of a pulse period of the pulses derived from the pulse encoder multiplied by four when the motor speed is indicates 1/2000 of the rated motor speed.

16. A system for controlling a motor speed as set forth in claim 9, which further includes: a predicted speed calculating block which calculates a predicted motor speed for each control period until one of subsequent pulse indicating the average speed value of the motor speed derived from the pulse encoder; a comparator which receives the predicted motor speed value from the predicted speed calculating block and the speed estimated value from the second deviating block, output a predetermined ON signal when the estimated value form the second deviating block is larger than the predicted speed value, and outputs a predetermined OFF signal when the estimated value from the second deviating block is smaller or equal to predicted speed value; a switching contact which connects the minus input end of the fourth deviating block to the predicted speed calculating block in response to the predetermined ON signal from the comparator and connected the minus input end of the fourth deviating block to the speed estimated value of the second deviating block in response to the predetermined OFF signal from the comparator.

17. A system for controlling a motor speed as set forth in claim 16, wherein said predicted speed calculating block calculates the predicted speed value $n_{(i)}$ as follows:

$n_{(i)} = 60/pp.1/i.Ts$, wherein pp denotes the number of pulses per rotation of the pulse encoder and Ts denotes the control period.

18. A system for controlling a motor speed as set forth in claim 2, wherein said calculating block calculates the average value $n_M'(j)$ of the model output estimated value $n_{M'}(i)$ using the following equation established at a time between j and j+1:

$$n_{M'(j+1)} = \frac{n_{M'}(Ts - \Delta TE_{j-1}) \cdot (Ts - \Delta TE_{j-1}) + n \cdot Ts + Ts - \Delta TE_{j-1}) + n_{M'(0 \sim jn)}}{\Delta TE_j \cdot n \cdot Ts + n_{M'} \Delta TE_j \cdot \Delta TE_j}$$

wherein $n_{M'}(Ts - \Delta TE_{j-1}) = (n_{M'j} + n_{M'j0})/2$, $n_{M'j0} = n_{M'j} + (Ts - \Delta TE_{j-1})/T_M \cdot \{\tau_{M\ j-1n} - \tau_L(j)\}$, $n_{M'j} = n_{M'j-1n} + \Delta TE_{j-1}/T_M \cdot \{\tau_{M\ j-1n} - \tau_L(j-1)\}$, $$n_{M'0 \sim jn} = \frac{\sum_{K=0}^{K=n-1} \{(n_{M'jk} + n_{M'jk} + 1)/2\}}{n}$$

$n_{M'} \sim n_{M'}jn$: model output estimated values at (j, 0) ~ (j, n) time order, $n_{M'}\Delta TE_j = (n_{M'jn} + n_{M'j+1})/2$ $Ts - \Delta TE_{j-1}$: a timing deviation interval between i and j, Ts denotes the speed control period, and $\Delta TE_j$ denotes a time difference between j and (j-1, n).

19. A system for controlling a motor speed as set forth in claim 18, wherein said observer gain block includes a variable gain block which varies the observer gain Kc according to the detected speed as follows:

$$Kc = \frac{Ts}{(Ts - \Delta TE_{j-1}) + n \cdot Ts + \Delta TE_j}$$

20. A system for controlling a motor speed as set forth in claim 18, wherein said observer gain block includes a variable gain block which varies the observer gain Kc according to the detected speed as follows:

$Kc = 1/n$

21. A system for controlling a motor speed for an electric motor in an extremely low speed range having a rotary pulse encoder which outputs a pulse whenever a rotation axle of the motor has rotated through a predetermined angle, the extremely low speed range being defined such that a pulse interval of the output pulses is longer than a speed control period of the system, comprising:

a least order disturbance, load torque estimated value observer, said observer including:

a first calculating block which calculates an estimated value of the motor speed $n_{M'}(j)$ from a prestored motor model on the basis of a torque command and a load torque estimated value;

a second calculating block which calculates an average value of the motor speed at each pulse interval $n_M'(j)$ as follows:

$n_M'(j) = [\Sigma n_{M'}(i)]j/n(j)$, wherein i denotes the speed control period and j denotes the pulse interval of the pulse encoder, a first deviating block which calculates a difference between the average value of the motor speed derived from the second calculating block $n_M'(j)$ and an average value of the motor speed $n_M(j)$ derived on the basis of the pulses of the pulse encoder, a second deviating block which calculates a difference between the output value of the first deviating block $n_M'(i)$ and the deviated output $n_M(j) - n_M'(j)$ of the first deviating block to derive the value of $n_M(i)$, a proportional gain observer which outputs the estimated load torque value $\tau_L(j)$ from the deviated output of the first deviating block, and a third deviating block which allocates a difference between the load torque command $\tau_M(i)$ and the load estimated value $\tau_L(j)$ from the proportional gain observer.

22. A method for controlling a motor speed for an electric motor in an extremely low speed range using a rotary pulse encoder which outputs a pulse whenever a rotation axle of the motor has rotated through a predetermined angle and a least order disturbance, load torque estimated value observer, the extremely low speed range being defined such that a pulse interval of the output pulses is longer than a speed control period, comprising the steps of:

a) calculating an estimated value of the motor speed $n_M'(j)$ from a prestored motor model on the basis of a torque command and a load torque estimated value;

b) calculating an average value of the motor speed at each pulse interval $n_M'(j)$ as follows:

$n_M'(j) = [\Sigma n_{M'}(i)]j/n(j)$, wherein i denotes the speed control period and j denotes the pulse interval of the pulse encoder, c) providing a first deviation output between the average value of the motor speed derived in the step b) $n_M'(j)$ and an average value of the motor speed $n_M(j)$ derived on the basis of the pulses of the pulse encoder.

d) providing a second deviation output between the output value derived in the step a) $n_M'(i)$ and the deviated output of the step c) to derive the value of $n_M(i)$, (e) outputting the estimated load torque value $\tau_L(j)$ from the first deviated output of the step c), and f) providing a third deviation output between the load torque command $\tau_M(i)$ and the load estimated value $\tau_L(j)$ derived in the step e).

* * * * *